US008525917B2

(12) United States Patent
Taniguchi

(10) Patent No.: US 8,525,917 B2
(45) Date of Patent: Sep. 3, 2013

(54) IMAGE SENSING APPARATUS WITH PLURAL FOCUS DETECTION PIXEL GROUPS

(75) Inventor: Hidenori Taniguchi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 12/664,529

(22) PCT Filed: Jul. 24, 2008

(86) PCT No.: PCT/JP2008/063719
§ 371 (c)(1),
(2), (4) Date: Dec. 14, 2009

(87) PCT Pub. No.: WO2009/020031
PCT Pub. Date: Feb. 12, 2009

(65) Prior Publication Data
US 2010/0165176 A1 Jul. 1, 2010

(30) Foreign Application Priority Data

Aug. 6, 2007 (JP) ................................. 2007-204574

(51) Int. Cl.
*H04N 5/232* (2006.01)
*G03B 13/00* (2006.01)
(52) U.S. Cl.
USPC ..................... 348/345; 348/220.1; 348/240.1
(58) Field of Classification Search
USPC ................... 348/345–356, 220.1, 222.1, 302, 348/308, 240.99, 240.1, 240.2; 396/79–82, 396/121, 124, 139
See application file for complete search history.

(56) References Cited

U.S. PATENT DOCUMENTS

| 5,367,153 | A | 11/1994 | Suda et al. | |
| 5,861,917 | A * | 1/1999 | Tariki et al. | 348/230.1 |
| 6,597,868 | B2 | 7/2003 | Suda | 396/111 |
| 6,819,360 | B1 | 11/2004 | Ide et al. | 348/340 |
| 6,829,008 | B1 * | 12/2004 | Kondo et al. | 348/302 |
| 2003/0169355 | A1 | 9/2003 | Kubo | |
| 2004/0125230 | A1 | 7/2004 | Suda | |
| 2007/0154200 | A1 | 7/2007 | Utagawa et al. | |
| 2007/0237429 | A1 | 10/2007 | Kusaka | 382/312 |

FOREIGN PATENT DOCUMENTS

| JP | 5127074 A | 5/1993 |
| JP | 2000-156823 A | 6/2000 |
| JP | 2000-292686 A | 10/2000 |
| JP | 2001-208961 A | 8/2001 |

(Continued)

OTHER PUBLICATIONS

Machine English Translation of JP 2003-250080 A (Published on Sep. 5, 2003).*

(Continued)

*Primary Examiner* — Nelson D. Hernández Hernández
(74) *Attorney, Agent, or Firm* — Fitzpatrick, Cella, Harper & Scinto

(57) ABSTRACT

An image sensing apparatus comprises an image sensor having a pair of focus detection pixel groups and a plurality of image sensing pixels, and a control unit that, in a thinning readout mode that reads out signal charges from a portion of pixels disposed within a part of pixels of the image sensor, controls so that at least the pair of focus detection pixel groups are included in the part of the pixels from which signal charges are read out.

6 Claims, 12 Drawing Sheets

(56) References Cited

FOREIGN PATENT DOCUMENTS

| JP | 2001-305415 A | 10/2001 |
|----|---------------|---------|
| JP | 2003-156677 | 5/2003 |
| JP | 2003244712 A | 8/2003 |
| JP | 2003-250080 A | 9/2003 |
| JP | 2007-158597 A | 6/2007 |
| JP | 2007-279597 A | 10/2007 |

OTHER PUBLICATIONS

Machine English Translation of JP 2007-158597 A (Published on Jun. 21, 2007).*
Nov. 14, 2011 European Search Report in Application No. 08791948.6-1240 / 2181349 PCT/JP2008063719.
Japanese Office Action dated Sep. 18, 2012, in corresponding Japanese Patent Application No. 2008-194076.

* cited by examiner

FULL-PIXEL READOUT

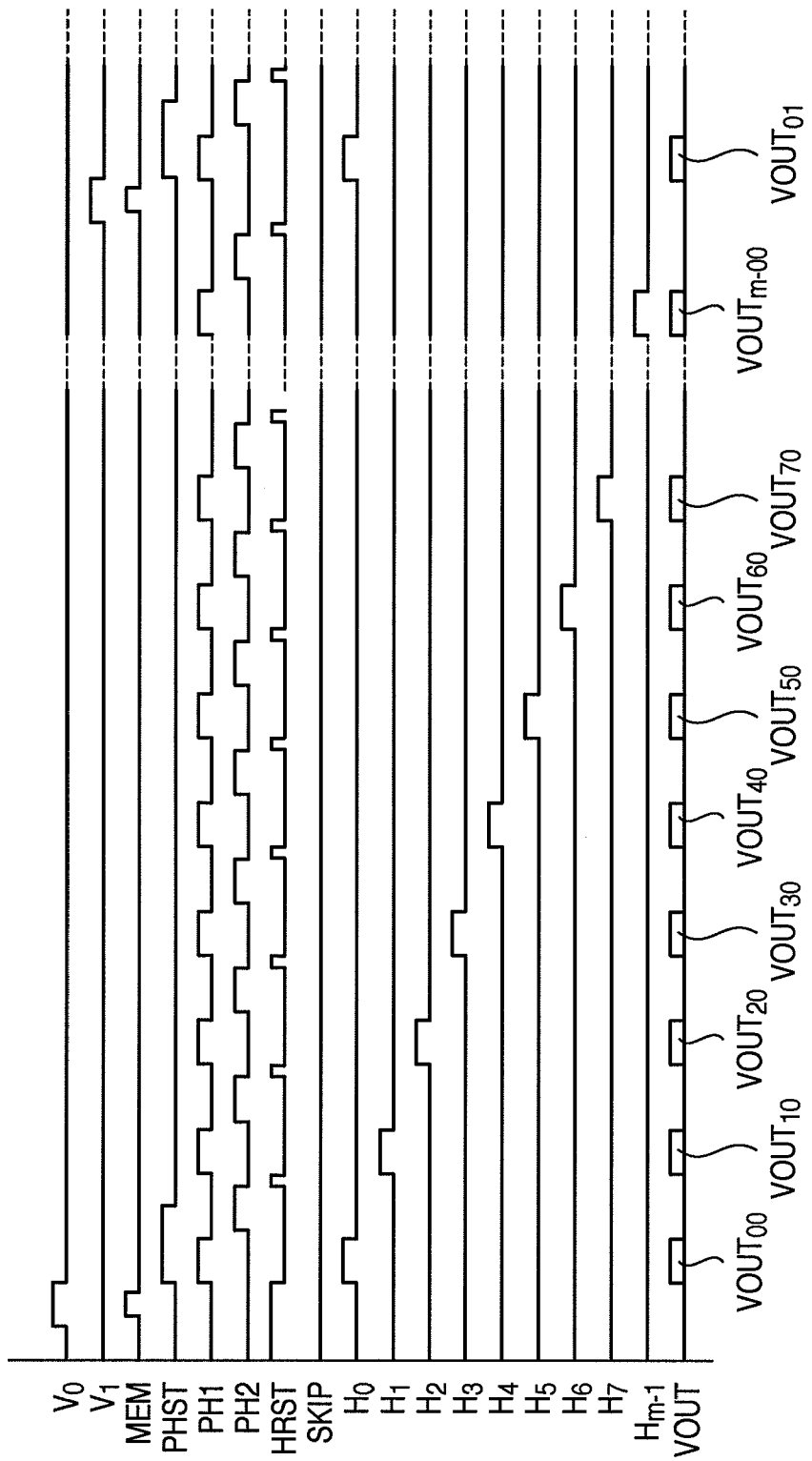

THINNING READOUT

THINNING READOUT TIMING CHART

PLAN VIEW

CROSS-SECTIONAL VIEW ALONG A-A

PLAN VIEW

CROSS-SECTIONAL VIEW ALONG A-A

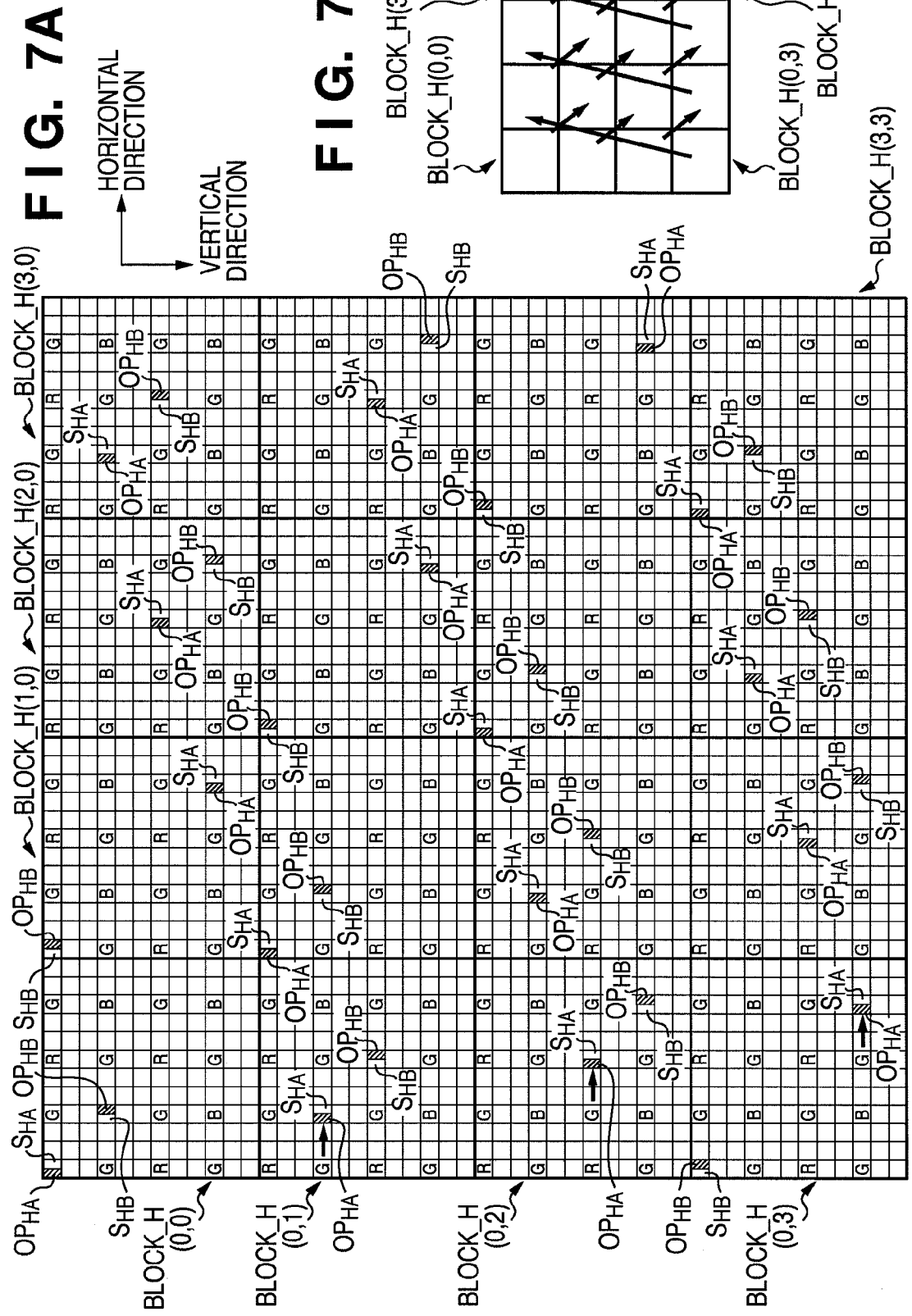

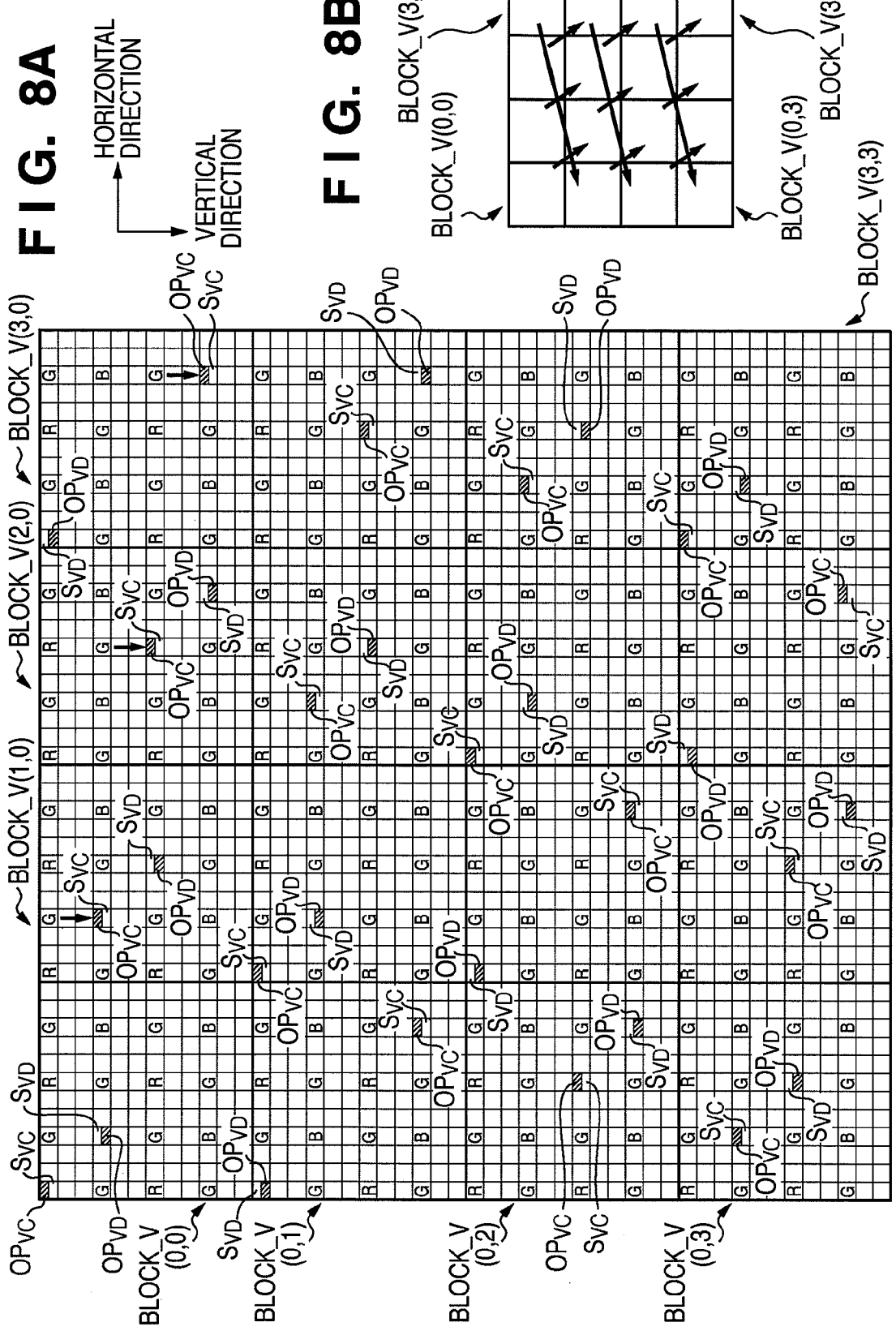

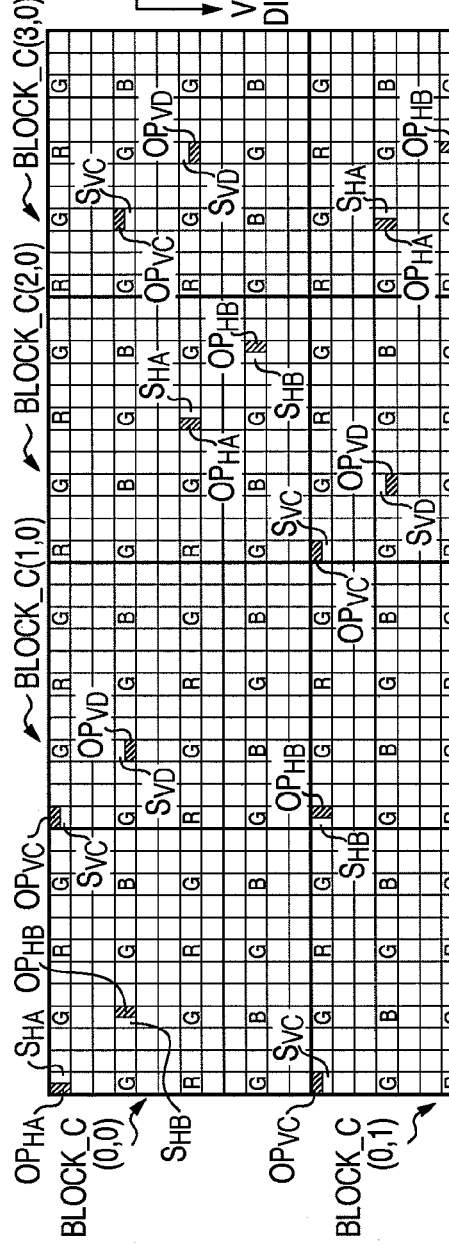
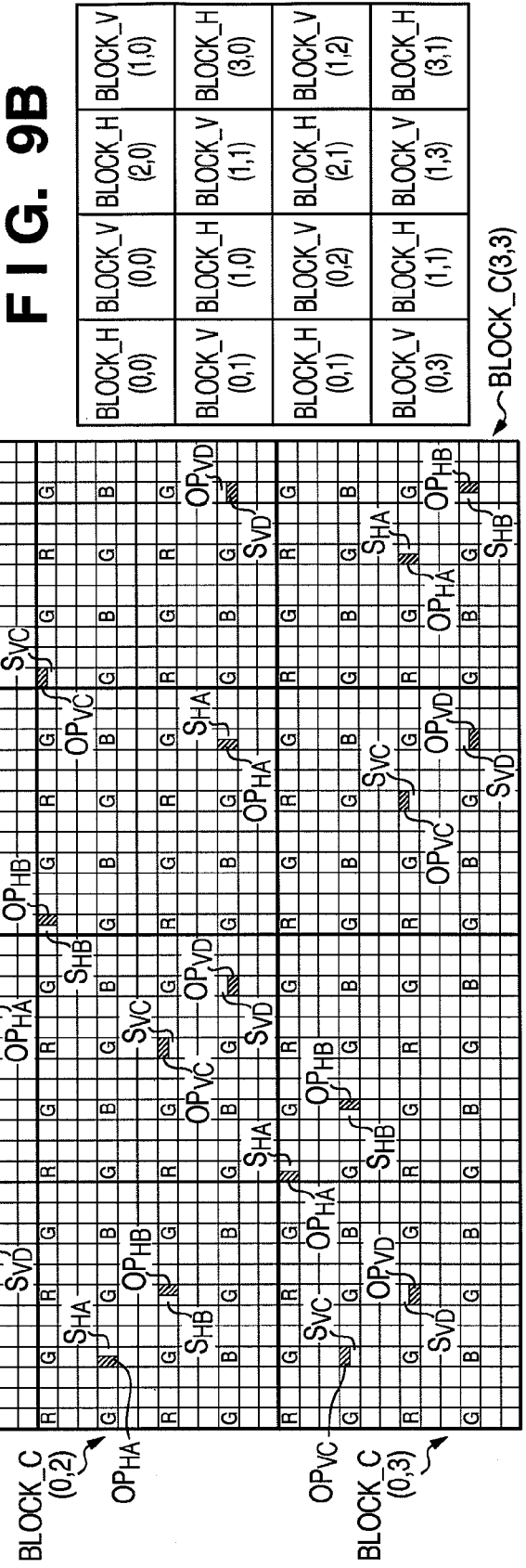
FIG. 9A
FIG. 9B

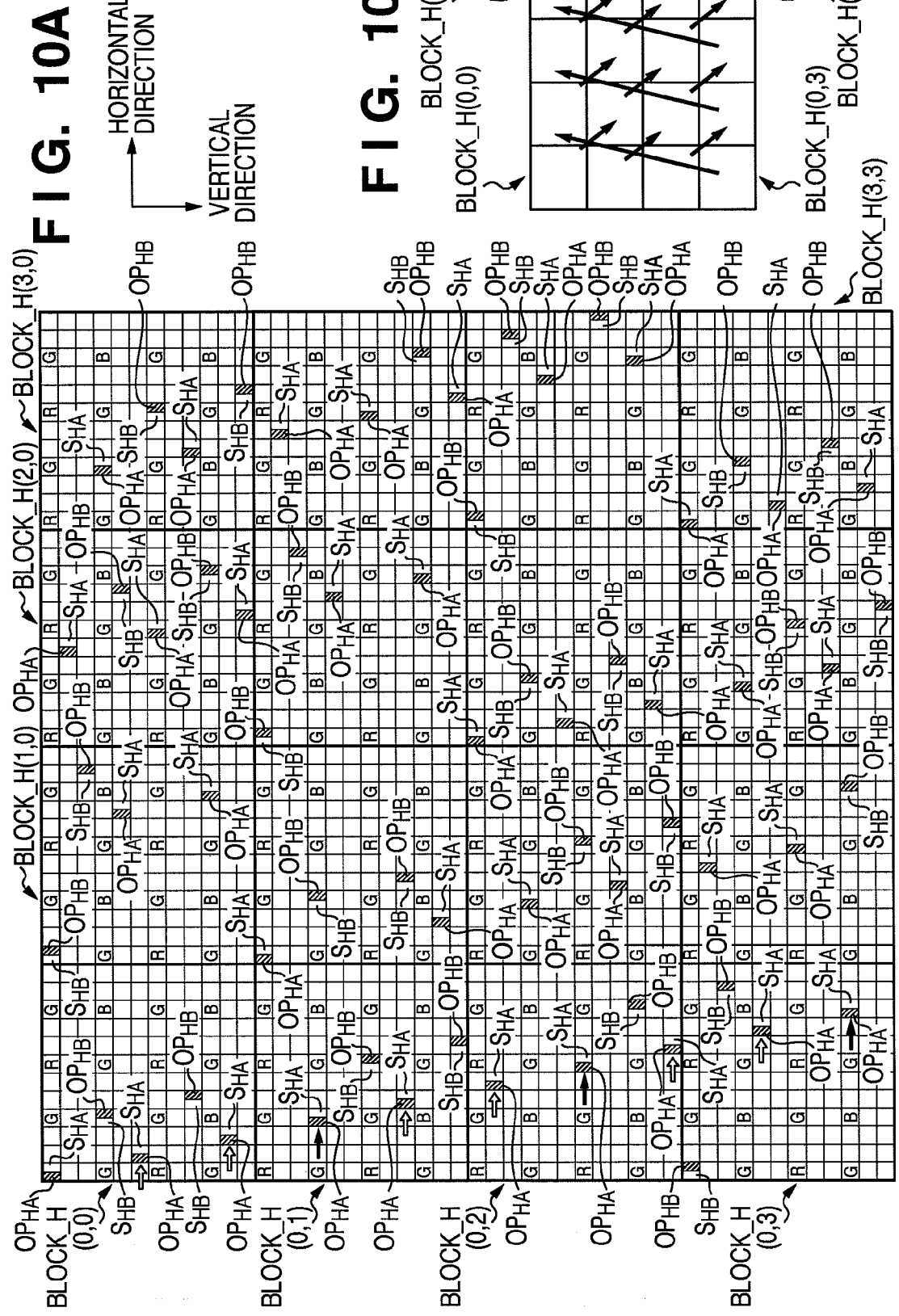

IMAGE SENSING APPARATUS WITH PLURAL FOCUS DETECTION PIXEL GROUPS

TECHNICAL FIELD

The present invention relates to an image sensing apparatus capable of image sensing using a plurality of photoelectric converter elements arranged two-dimensionally.

BACKGROUND ART

Two common methods of auto-focus detection and adjustment for an image sensing apparatus using a light flux that passes through the photographing lens are the contrast detection method (also called the blur method) and the phase difference focus detection method (also called the shift method).

In the contrast detection method, which is widely used in video cameras for moving image photography and in electronic still cameras, the image sensor is used as a focus detection sensor. In this method, of the output signals of the image sensor, information of the high frequency component (contrast information) in particular is concentrated on, and the position of the focus lens at which an evaluation value for that contrast information is at its maximum is taken as the focus position. However, as it is also called the mountain-climbing method, this method involves getting evaluations of the contrast while moving the focus lens in minute amounts and thus requires moving the lens until it is determined which evaluation was in the end the maximum, and therefore is unsuitable for high-speed focus control.

The phase difference focus detection method is widely used in single-lens reflex film-type cameras, and is the technology that has contributed the most to the commercialization of the AutoFocus (AF) single-lens reflex camera. In the phase difference focus detection method, a light flux passing through the exit pupil of the photographing lens is split in two, with the split light fluxes respectively received by a set of focus detection sensors. By detecting an amount of shift in signals that are output according to the amount of light received, that is, by detecting the amount of shift in relative positions in the direction of split of the light flux, the amount by which the photographing lens is out of focus can be obtained directly. Therefore, once charged by the focus detection sensors, the amount by and direction in which the lens is out of focus is obtained, making high-speed focus control possible. However, in order to split the light flux passing through the exit pupil of the photographing lens in two and obtain signals for each of the split light fluxes, typically a light path split mechanism, such as a quick-return mirror or a half-mirror, is provided in the image sensing light path, with a focus detection optical system and an AF sensor at the end. As a result, the apparatus increases in size as well as cost.

At the same time, however, CCD and CMOS image sensors are now widely used in place of film as the image sensing medium even in single-lens reflex cameras as well. As a result, models have now appeared that are equipped with an electronic viewfinder mode realized by withdrawing the quick-return mirror from the image sensing path so as to display an object on a display device provided in the camera body and enable the user to view the object and a moving image recording mode that simultaneously records moving images on a recording medium.

There is a drawback in this case, in that a focus detection apparatus of the phase difference focus detection method described above, because the quick-return mirror is withdrawn, cannot be operated.

To solve the above-described drawback, a technology that provides the image sensor with a phase difference detection capability, thus eliminating the need for a dedicated AF sensor and achieving high-speed phase difference AF, has also been disclosed.

In Japanese Patent Application Laid-Open (JPA) No. 2000-156823, a pupil dividing function is provided at a portion of the light-receiving elements (pixels) of the image sensor by shifting a sensitive area of the light-receiving part with respect to an optical axis of an on-chip microlens. Then, these pixels are used as focus detection pixels, which are disposed at predetermined intervals between image sensing pixel groups to carry out phase difference focus detection. In addition, since the locations at which the focus detection pixels are disposed correspond to image sensing pixel loss parts, they are interpolated using adjacent image sensing information to generate image information.

Japanese Patent Application Laid-Open (JPA) No. 2000-292686 provides a pupil dividing capability by dividing the light-receiving part of a portion of the pixels of the image sensor in two. These pixels are then used as focus detection pixels, which are disposed at predetermined intervals between image sensing pixel groups to carry out phase difference focus detection. In addition, in this approach as well, since the locations at which the focus detection pixels are provided are locations where image sensing pixels are lost, they are interpolated using adjacent image sensing information to generate image information of the lost pixels.

Japanese Patent Application Laid-Open (JPA) No. 2001-305415 provides a pupil dividing capability by dividing the light-receiving part of a portion of the pixels of the image sensor in two. Then, the outputs from the light-receiving part divided in two are processed individually to carry out phase difference focus detection, and by adding together the outputs from the light-receiving part divided in two are also used as the image sensing signal.

However, the above-described known art has the following drawbacks.

In the art disclosed in Japanese Patent Application Laid-Open (JPA) No. 2000-156823, Japanese Patent Application Laid-Open (JPA) No. 2000-292686, and Japanese Patent Application Laid-Open (JPA) No. 2001-305415, there are differences in the light-receiving characteristics, such as the light-receiving part surface area of the focus detection pixels is small compared to that of the image sensing pixels, or the center of gravity of the light-receiving area is shifted with respect to the optical axis of the on-chip microlens. As a result, at the location where the focus detection pixels are disposed the pixel information is lost, or, because it has a large error if used as image information, it is necessary to interpolate from the adjacent image sensing pixels to generate the image signal.

Accordingly, if the disposition density of the focus detection pixels can be reduced, the deterioration in picture quality due to pixel loss as described above can be reduced, but at the cost of degrading focus detection image sampling characteristics and reducing focus detection performance. In other words, in this technical field, in order to both maintain focus detection performance and prevent picture quality deterioration, the method of disposition of the focus detection pixels is very important. However, in Japanese Patent Application Laid-Open (JPA) No. 2000-156823, Japanese Patent Application Laid-Open (JPA) No. 2000-292686, and Japanese Patent Application Laid-Open (JPA) No. 2001-305415, the focus detection pixels are concentrated in one area. As a result, the focus detection area is restricted to a specific location in the image sensing area, and in that area picture quality degradation tends to be most easily noticeable because of the low distribution density of image sensing pixels thereat.

In addition, in the electronic viewfinder mode and the moving image mode, smooth screen display is very important. Moreover, and also because resolutions higher than those of still images are not required, typically, the output of the image sensor is often subjected to thinning readout to produce the image in order to increase the frame rate.

With the disposition of the focus detection pixels described in Japanese Patent Application Laid-Open (JPA) No. 2000-156823, in a case in which the image sensor is subjected to thinning readout, the focus detection pixels are not read out, and the phase difference focus detection method cannot be carried out.

In the inventions described in Japanese Patent Application Laid-Open (JPA) No. 2000-292686 and Japanese Patent Application Laid-Open (JPA) No. 2001-305415 as well, because the focus detection pixels are concentrated in one area, in a case in which thinning readout is carried out, the focus detection pixels are thinned. As a result, sampling characteristics deteriorate and focus detection performance deteriorates dramatically.

DISCLOSURE OF INVENTION

The present invention has been made in consideration of the above situation, and has as its object to carry out focus detection effectively in a case in which signal charges are read out from a portion of the pixels disposed within a predetermined area.

According to the present invention, the foregoing object is attained by providing an image sensing apparatus comprising: an image sensor having a pair of focus detection pixel groups and a plurality of image sensing pixels; and control means that, in a thinning readout mode that reads out signal charges from a portion of pixels disposed within a part of pixels of the image sensor, controls so that at least the pair of focus detection pixel groups are included in the part of the pixels from which signal charges are read out.

Further features of the present invention will become apparent from the following description of exemplary embodiments (with reference to the attached drawings).

BRIEF DESCRIPTION OF DRAWINGS

FIGS. 3A and 3B are diagrams for explaining full-pixel readout according to a preferred embodiment of the present invention;

FIGS. 7A and 7B show a focus detection pixel vertical line detection disposition according to a preferred embodiment of the present invention;

FIGS. 8A and 8B show a focus detection pixel horizontal line detection disposition according to a preferred embodiment of the present invention;

FIGS. 9A and 9B show a focus detection pixel vertical line/horizontal line detection disposition according to a preferred embodiment of the present invention; and FIGS. 10A and 10B show a focus detection pixel vertical line detection disposition according to a preferred embodiment of the present invention.

BEST MODE FOR CARRYING OUT THE INVENTION

Preferred embodiments of the present invention will now be described in detail in accordance with the accompanying drawings.

Figure 1:
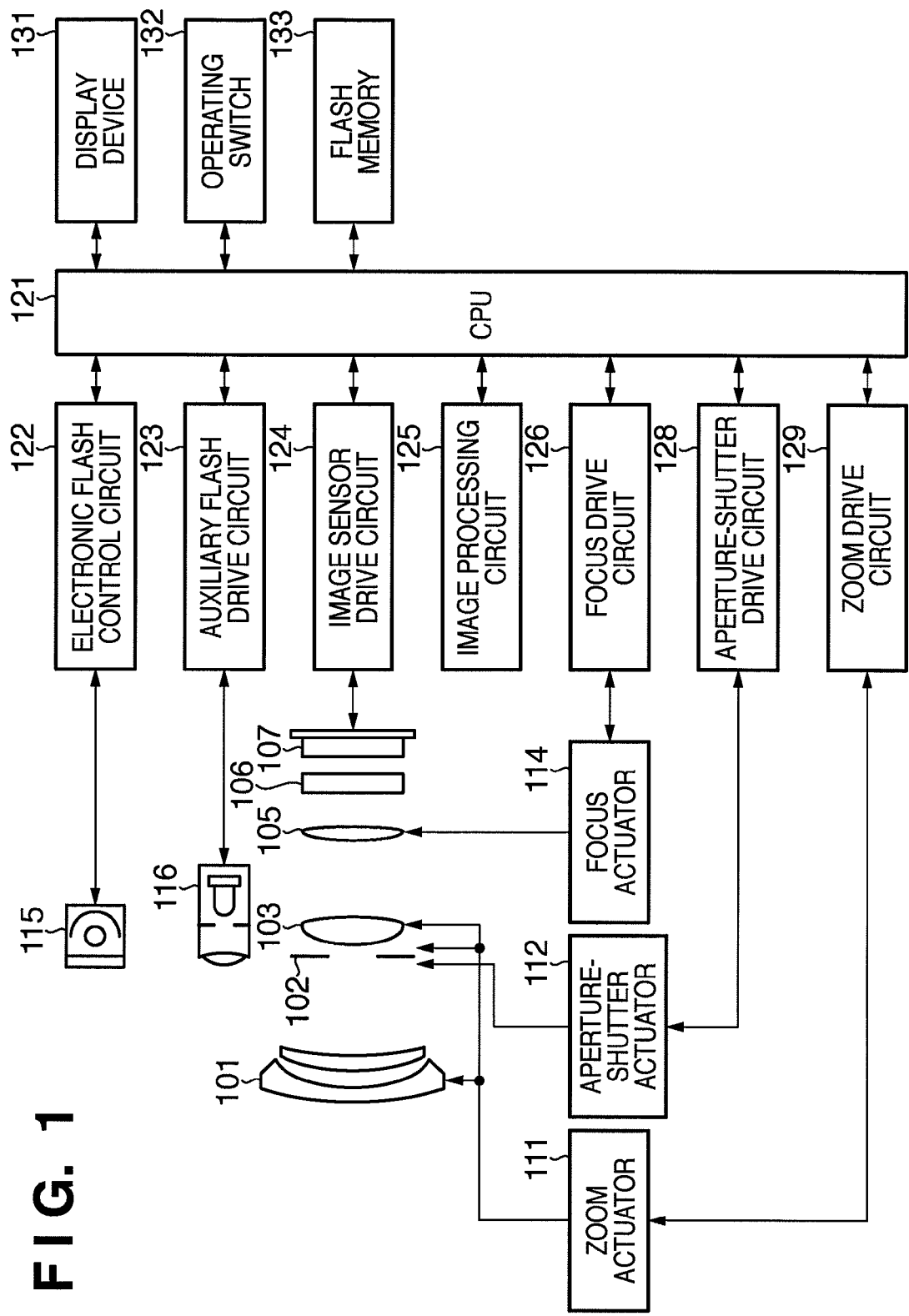
FIG. 1 is a block diagram illustrating a configuration of an image sensing apparatus according to a preferred embodiment of the present invention.

FIG. 1 is a configurational diagram of an image sensing apparatus according to a preferred embodiment of the present invention, showing an electronic camera in which a camera body including an image sensor and a photographing optical system are integrated into a single unit. In FIG. 1, reference numeral 101 denotes a first lens group disposed on the front end of a photographing optical system (focusing optical system), supported so as to be movable forward and backward along an optical axis. Reference numeral 102 denotes a combined aperture-shutter, adjustment of the diameter of the opening of which adjusts the amount of light during photography and also has a function to adjust the exposure time during still image photography. Reference numeral 103 denotes a second lens group. The aperture-shutter 102 and the second lens group 103 move together forward and backward along the optical axis, and, in conjunction with the movement forward and backward of the first lens group 101, provide a magnification change effect (a zoom function).

Reference numeral 105 denotes a third lens group, which, by moving forward and backward along the optical axis, carries out focus adjustment. Reference numeral 106 denotes a low-pass optical filter, and is an optical element for the purpose of reducing false color and moiré of a photographed image. Reference numeral 107 denotes an image sensor composed of a CMOS image sensor and the surrounding circuitry. A two-dimensional, single-plate color sensor in which an on-chip Bayer arrangement primary color mosaic filter is disposed on m horizontal-direction and n vertical-direction light-receiving pixels is used as the image sensor 107.

Reference numeral 111 denotes a zoom actuator, which carries out a magnification-change operation by rotation of a cam barrel, not shown, to move the first lens group 101 through the second lens group 103 forward and backward along the optical axis. Reference numeral 112 denotes an aperture-shutter actuator, which controls the diameter of the opening of the aperture-shutter 102 and adjusts the amount of light for photography, and also controls the exposure time during still image photography. Reference numeral 114 denotes a focus actuator, which moves the third lens group 105 forward and backward along the optical axis and adjusts the focus.

Reference numeral 115 denotes an electronic flash for illuminating an object during photography. A flash illumination device that uses a Xenon tube is preferable, but an illumination device comprised of a continuous-flash LED may also be used. Reference numeral 116 denotes an AF auxiliary flash unit, which projects an image of a mask having a predetermined opening pattern onto an object field through a projective lens to improve focus detection capability with respect to dark objects and low-contrast objects.

Reference numeral 121 denotes a CPU, which controls the camera main unit in various ways within the image sensing apparatus. The CPU 121 may, for example, have a calculation unit, ROM, RAM, A/D converter, D/A converter, communication interface circuitry, and so forth. In addition, the CPU 121, based on predetermined programs stored in the ROM, executes a set of operations such as driving the various circuits that the image sensing apparatus has, AF, photography, image processing and recording, and so forth.

Reference numeral 122 denotes an electronic flash control circuit, which controls firing of the electronic flash 115 in synchrony with a photography operation. Reference numeral 123 denotes an auxiliary flash drive circuit, which controls firing of the AF auxiliary flash unit 116 in synchrony with a focus detection operation. Reference numeral 124 denotes an image sensor drive circuit, which controls the image sensing action of the image sensor 107 as well as A/D-converts acquired image signals and transmits the converted image signals to the CPU 121. Reference numeral 125 denotes an image processing circuit, which performs such processing as γ conversion, color interpolation, JPEG compression and the like on the images acquired by the image sensor 107.

Reference numeral 126 denotes a focus drive circuit, which, based on focus detection results, controls driving of the focus actuator 114 so as to move the third lens group 105 forward and backward along the optical axis and adjust the focus. Reference numeral 128 denotes an aperture-shutter drive circuit, which controls driving of the aperture-shutter actuator 112 and controls the opening of the aperture-shutter 102. Reference numeral 129 denotes a zoom drive circuit, which drives the zoom actuator 111 in response to a zoom operation by the photographer.

Reference numeral 131 denotes a display device such as an LCD, which displays information relating to the photographic mode of the image sensing apparatus, pre-photography preview images and post-photography confirmation images, focus state display images during focus detection, and the like. Reference numeral 132 denotes an operating switch group, composed of a power switch, a release (photography trigger) switch, a zoom operation switch, a photographic mode selection switch, and the like. Reference numeral 133 denotes a detachable flash memory, which records photographed images.

Figure 2:
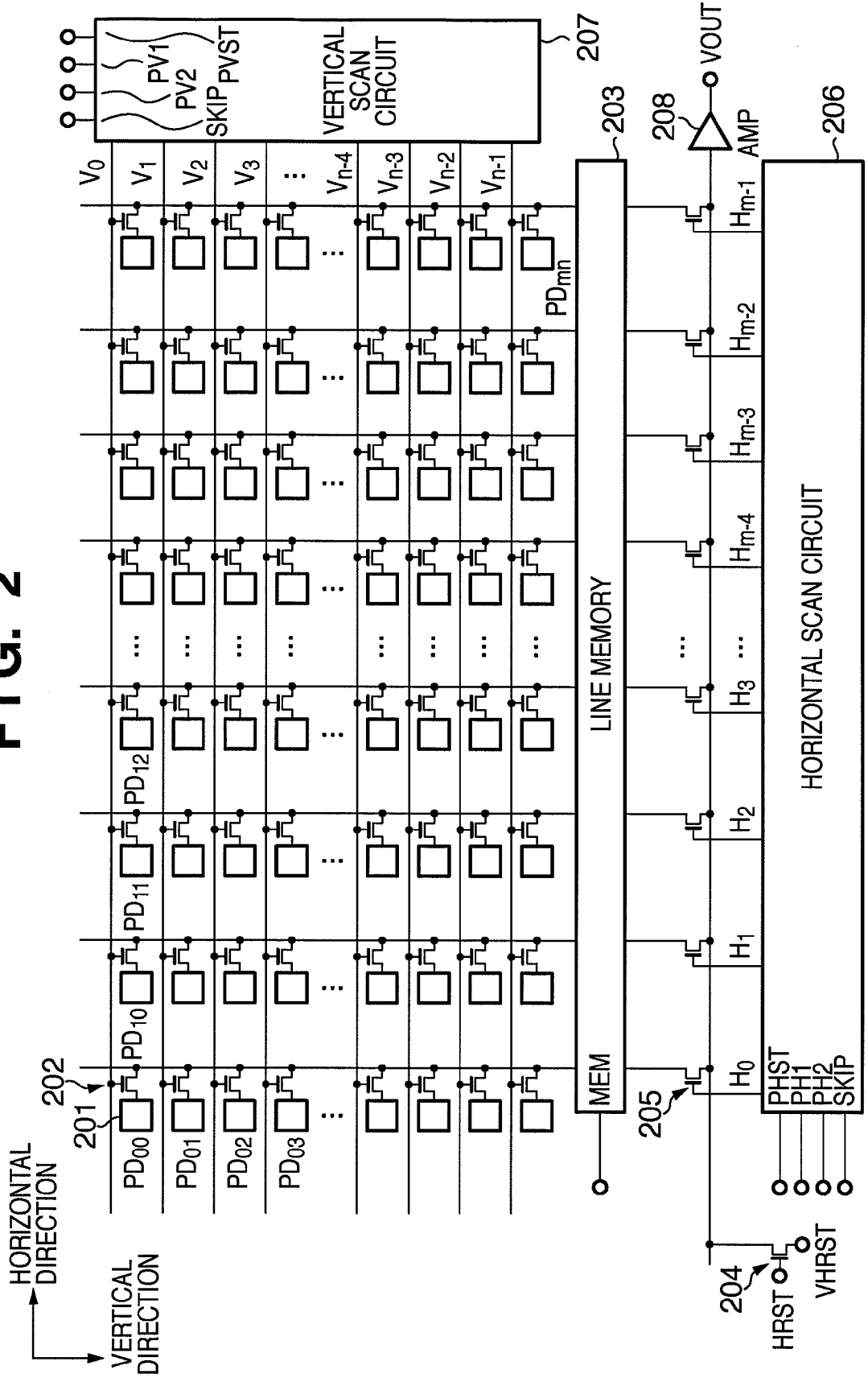
FIG. 2 is a block diagram of an image sensor according to a preferred embodiment of the present invention.

FIG. 2 is a block diagram of the image sensor 107 according to a preferred embodiment of the present invention. It is to be noted that the block diagram of FIG. 2 shows the minimum structure required to explain a readout operation described later, and thus the pixel reset signal and the like are omitted. In FIG. 2, reference numeral 201 denotes photoelectric converter units, composed of a photodiode, a pixel amp, a reset switch, and the like. Hereinafter, the photoelectric converter units are referred to as $PD_{ij}$ (where i is the horizontal direction address and is an integer equal to or greater than 1, and j is the vertical direction address and is an integer equal to or greater than 1). In addition, in the image sensor according to a preferred embodiment of the present invention, m×n photoelectric converter units are disposed two-dimensionally. It is to be noted that the reference characters for individual photoelectric converter units are attached only to the upper left photoelectric converter unit $PD_{00}$ in order to simplify the diagram.

Reference numeral 202 denotes a switch for selecting the outputs of the photoelectric converter units $PD_{ij}$, which are selected one line at a time by a vertical scanning circuit described later.

Reference numeral 203 denotes a line memory for temporarily storing photoelectric converter unit 201 $PD_{ij}$ output, and stores one line of photoelectric converter unit output selected by the vertical scan circuit 207. A condenser may be used as the line memory 203.

Reference numeral 204 denotes a switch connected to a horizontal output line for resetting the horizontal output line to a predetermined electric potential VHRST, and is controlled by a signal HRST.

Reference numeral 205 denotes a switch for sequentially outputting the photoelectric converter unit $PD_{mn}$ output stored in the line memory 203 to the horizontal output line. As switches $H_0$ to $H_{m-1}$ are sequentially scanned by a horizontal scan circuit 206 described below, a line of photoelectric conversion output is read out.

Reference numeral 206 denotes the horizontal scan circuit, which sequentially scans the photoelectric converter unit output stored in the line memory 203 for output to the horizontal output line. A signal PHST is data input of the horizontal scan circuit 206, and PH1 and PH2 are shift clock inputs of the horizontal scan circuit 206. The horizontal scan circuit 206 is configured so that, when PH1 is at H level, data is set, and at PH2 data is latched. By inputting shift clocks to PH1 and PH2, PHST is sequentially shifted and switches from $H_0$ to $H_{m-1}$ are sequentially switched on. SKIP is a control terminal input for carrying out settings during thinning readout described later. By setting the SKIP terminal to H level, the horizontal scan circuit 206 can be skipped at a predetermined interval. The readout operation is described later.

Reference numeral 207 denotes the vertical scan circuit. By sequentially scanning and outputting from $V_0$ to $V_{n-1}$, the photoelectric converter unit $PD_{ij}$ selection switch 202 can be selected. The vertical scan circuit 207, like the horizontal scan circuit 206, is controlled by data input PVST, shift clocks PV1, PV2, and the thinning readout setting SKIP control signals. The operation of the vertical scan circuit 207 is the same as that of the horizontal scan circuit 206, and thus a detailed description thereof is omitted.

Figure 3A:
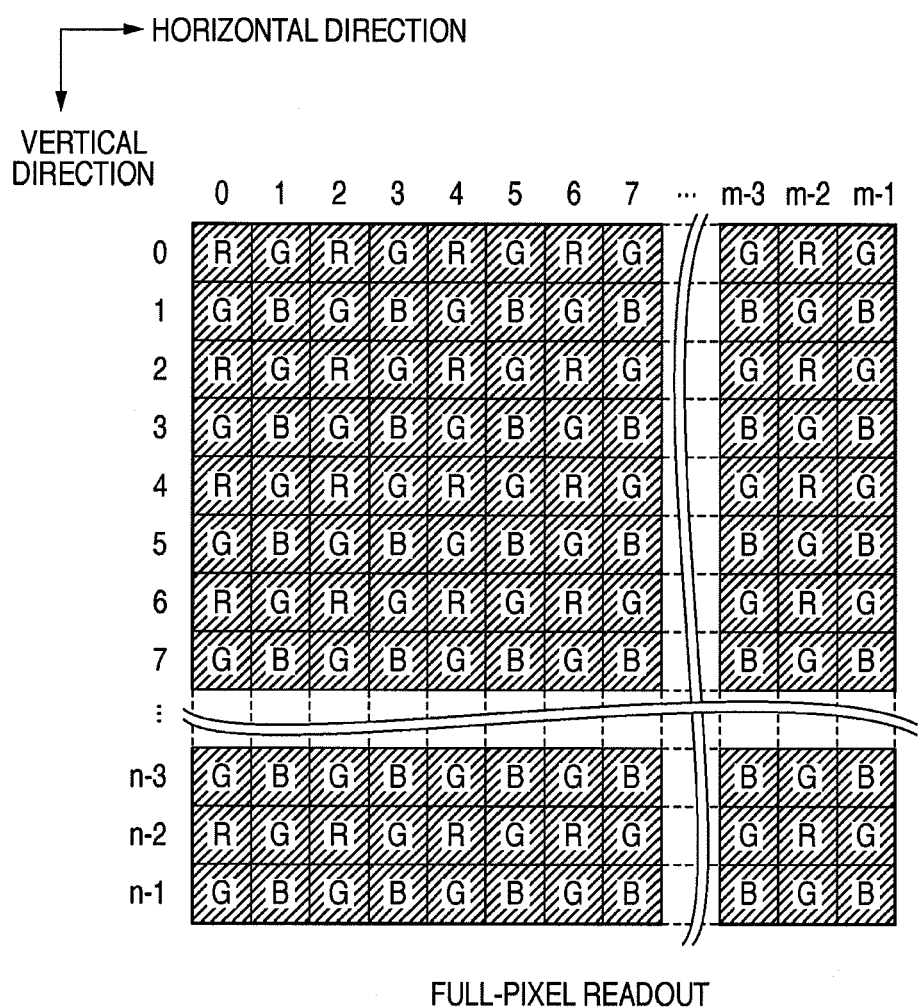

FIGS. 3A and 3B are diagrams illustrating a case in which all pixels of the image sensing apparatus 107 shown in FIG. 2 are read out. FIG. 3A is a diagram showing disposition of m×n photoelectric converter units 201. The R, G, and B signs depicted in FIG. 3A respectively represent red, green, and blue color filters applied to the photoelectric converter units PDij, the same as in FIGS. 4A to 10A. In the present embodiment, a description is given using as an example a Bayer arrangement, in which, of 4 pixels disposed in 2 rows×2 columns, at the 2 pixels positioned diagonally opposite each other are disposed pixels having spectral sensitivity to G green, and at the other 2 pixels are disposed 1 pixel each having a spectral sensitivity to R (red) and to B (blue). The numbers along the top and left sides in FIG. 3A are horizontal direction and vertical direction numbers. The pixels through which slanted lines are drawn are pixels targeted for readout. Since FIG. 3A shows a case of full-pixel readout, slanted lines are drawn in all of the pixels. In addition, in the image sensor 107, usually, shielded OB (optical black) pixels and the like to detect black level are provided, and the OB pixels are also read out. However, in the present embodiment, they will complicate the explication, and are therefore not depicted.

FIG. 3B is a diagram showing a timing chart in a case of reading out signal charges (data) of all the pixels of the image sensor 107. The CPU 121 controls the image sensor drive circuit 124 so as to send a pulse to the image sensor 107. A description is now given of a full-pixel readout operation with reference to FIG. 3B.

First, the vertical scan circuit 207 is driven, making $V_0$ active. At this time, the outputs of the pixels of line 0 are each output to the vertical output line. In this state, a MEM signal is made active and the data of each pixel is sample-held to the line memory 203. Next, the PHST is made active, the PH1 and the PH2 shift clocks are input, from $H_0$ to $H_{m-1}$ are made active in sequence, and the pixel outputs are output to the horizontal output line. The pixel outputs are output as VOUT via an amp 208, converted into digital data by an AD converter, not shown, and subjected to predetermined image processing at the image processing circuit 125. Next, the vertical scan circuit 207 makes $V_1$ active, and the pixel output of the first line is output to the vertical output line and similarly temporarily stored in the line memory 203 by the MEM signal. Subsequently, in the same way, the PHST is made active, the PH1 and the PH2 shift clocks are input, from $H_0$ to $H_{m-1}$ are made active in sequence, and the pixel outputs are output to the horizontal output line. In this manner, readout up to line n−1 is carried out in sequence.

Figure 4A:
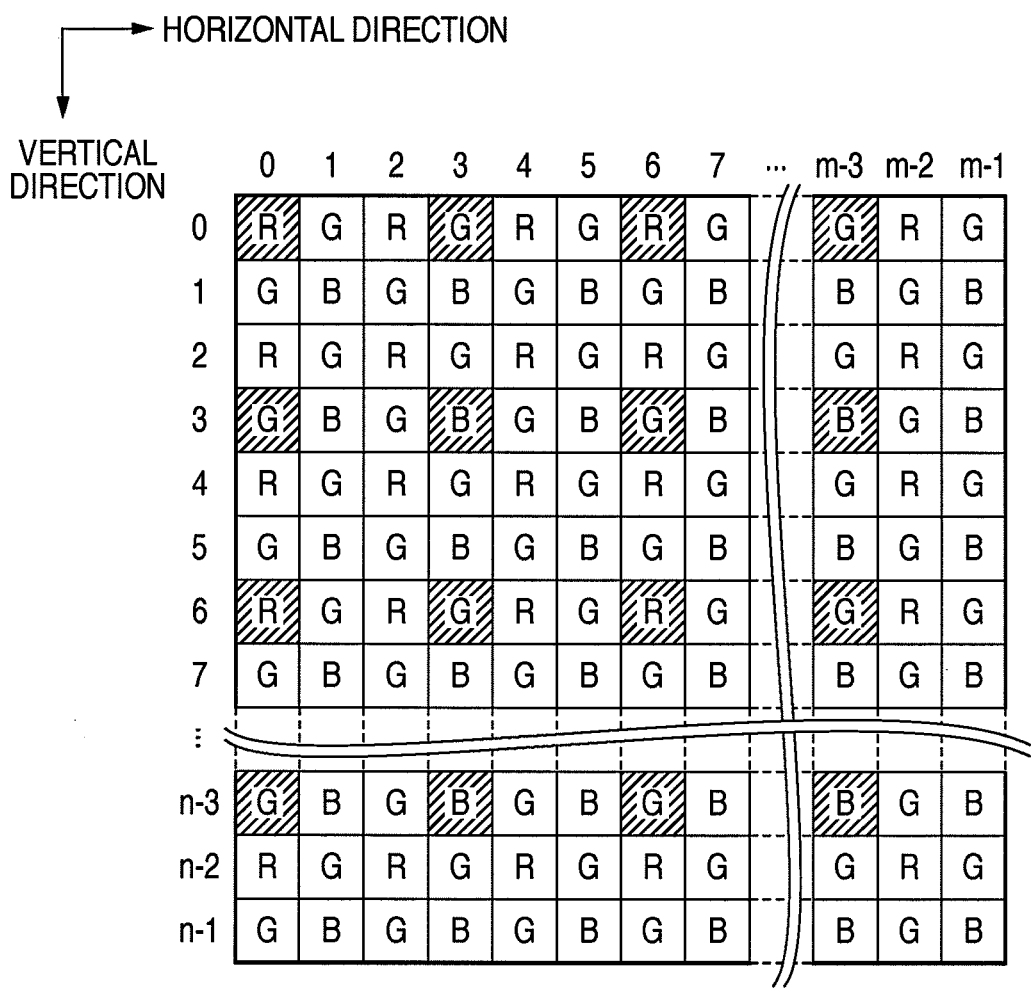
FIGS. 4A and 4B are diagrams for explaining thinning readout according to a preferred embodiment of the present invention.
Figure 4B:
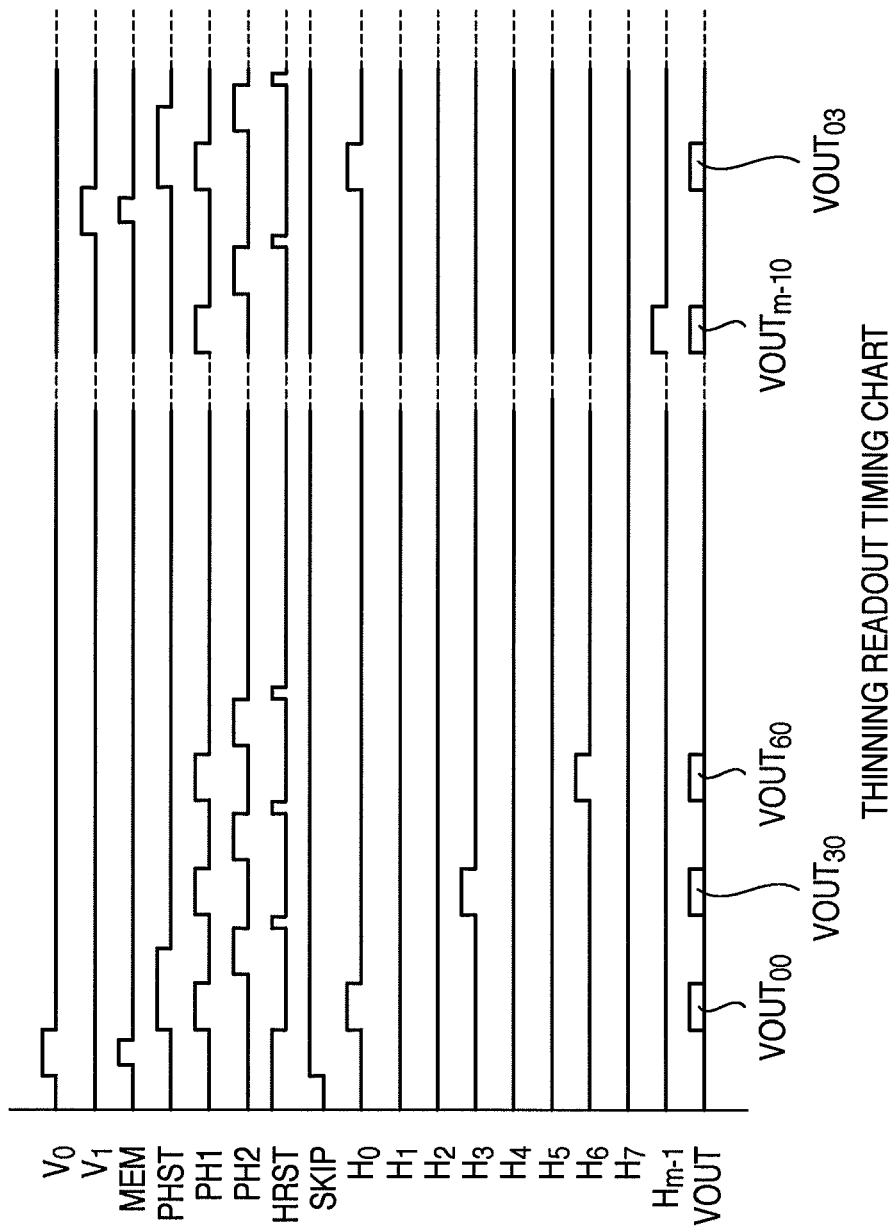

FIGS. 4A and 4B are diagrams illustrating an example of thinning readout of the image sensor 107 shown in FIG. 2. FIG. 4A is a diagram showing m×n photoelectric converter units 201 disposed within a first predetermined area, in the same image sensor shown in FIG. 3A. The pixel units through which slanted lines are drawn are pixels targeted for readout during thinning readout. In the present embodiment, readout is thinned to ⅓ in both the horizontal direction and in the vertical direction.

FIG. 4B is a diagram showing a timing chart during thinning readout. Using the timing chart shown in FIG. 3B, a description is now given of a thinning readout operation. Thinning readout setting is carried out by making the horizontal scan circuit 206 control terminal and the SKIP terminal active. By making the SKIP terminal active, the operations of the horizontal scan circuit 206 and the vertical scan circuit 207 are changed from sequential scanning of every single pixel to sequential scanning of every third pixel. The specific method by which this is accomplished is known art, and therefore a detailed description thereof is omitted.

In the thinning operation, first, the vertical scan circuit 207 is driven, making $V_0$ active. At this time, the outputs of the pixels of the 0th line are each output to the vertical output line. In this state, the MEM signal is made active and the data of each pixel is sample-held to the line memory 203. Next, the PHST is made active and the PH1 and the PH2 shift clocks are input. At this time, with the setting of the SKIP terminal to active the shift register route is changed, such that pixel outputs are output to the horizontal output line at every third pixel, sequentially, as in $H_0$, $H_3$, $H_6$ ... $H_{m-3}$. The pixel outputs are output as VOUT via the amp 208, converted into digital data by an AD converter, not shown, and subjected to predetermined image processing at the image processing circuit 125. Next, the vertical scan circuit 207, like the horizontal scan circuit 206, skips $V_1$ and $V_2$, makes $V_3$ active, and outputs the pixel output of the third line to the vertical output line. Subsequently, the pixel output is temporarily stored in the line memory 203 by the MEM signal. Next, similarly to the 0th line, the PHST is made active, the PH1 and the PH2 shift clocks are input, $H_0$, $H_3$, $H_6$ ... $H_{m-3}$ are made active in sequence, and the pixel outputs are output to the horizontal output line. In this manner, readout up to the n−3th line is carried out in sequence. Thus, as described above, ⅓ thinning readout is carried out both horizontally and vertically.

FIGS. 5A, 5B and FIGS. 6A, 6B are diagrams illustrating the structures of image sensing pixels and focus detection pixels. In the present embodiment, focus detection pixels of a structure described later are dispersed throughout the above-described Bayer arrangement with a predetermined regularity.

Figure 5B:
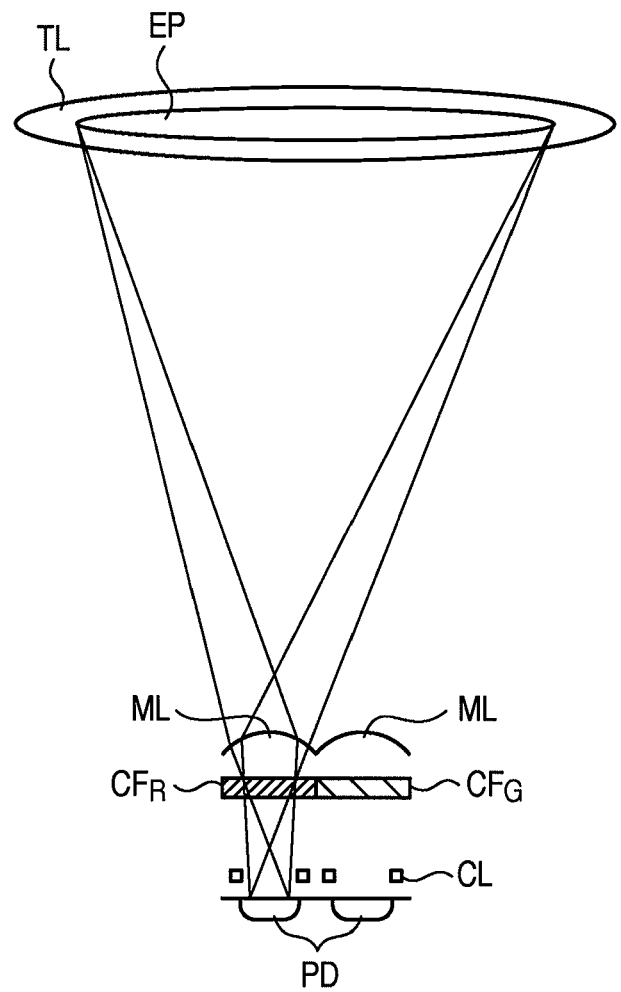
FIGS. 5A and 5B are plan and sectional views of an image sensing pixel of an image sensor according to a preferred embodiment of the present invention.
Figure 5A:
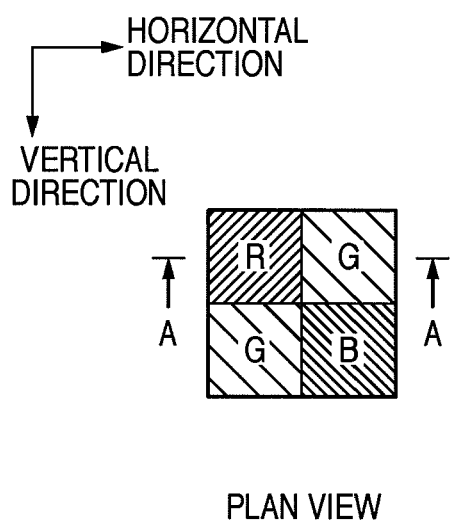

FIGS. 5A and 5B show the disposition and structure of the image sensing pixels. FIG. 5A is a plan view of 2 rows×2 columns of image sensing pixels. As is known, in a Bayer arrangement G pixels are disposed diagonally across from each other, with R and B pixels disposed at the other two pixels. The 2 row×2 column structure is repeated for disposition.

A cross-sectional view along A-A in FIG. 5A is shown in FIG. 5B. ML is the on-chip microlens disposed on the front surface of each pixel, $CF_R$ is a R (red) color filter, and $CF_G$ is a G (green) color filter. PD (PhotoDiode) is the photoelectric converter unit 201 of the CMOS image sensor described in FIG. 2, shown schematically. CL (Contact Layer) is a wiring layer for forming signal wires that transmit various signals within the CMOS image sensor. TL is the photographing optical system, shown schematically.

Here, the image sensing pixel's on-chip microlens ML and the photoelectric converter element PD are constructed so as to effectively take in as much of the light flux passing through the photographing optical system TL (Taking Lens) as possible. In other words, the microlens ML puts the photographing optical system TL exit pupil EP and the photoelectric converter element PD into a conjugate relation, and further, the effective surface area of the photoelectric converter element PD is designed to be a large surface area. In addition, although in FIG. 5B a description is given of a light flux entering an R pixel, the G pixels and the B (blue) pixels have the same structure. Therefore, the exit pupils EP for the RGB the image sensing pixels are large-diameter, such that the light flux (photons) from the object are effectively taken in and the image signal S/N ratio is improved.

Figure 6B:
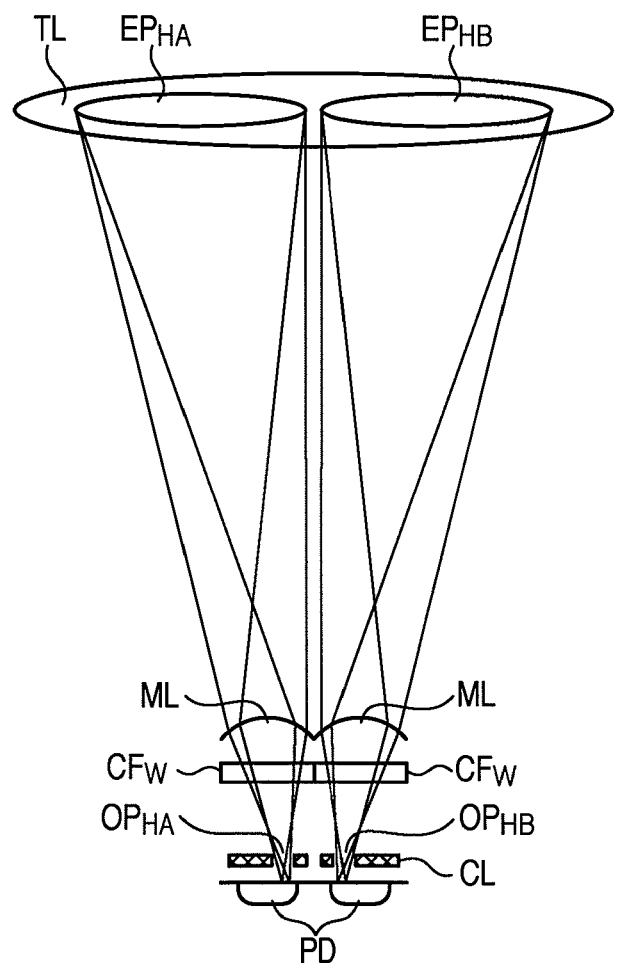
FIGS. 6A and 6B are plan and sectional views of a focus detection pixel of an image sensor according to a preferred embodiment of the present invention.
Figure 6A:
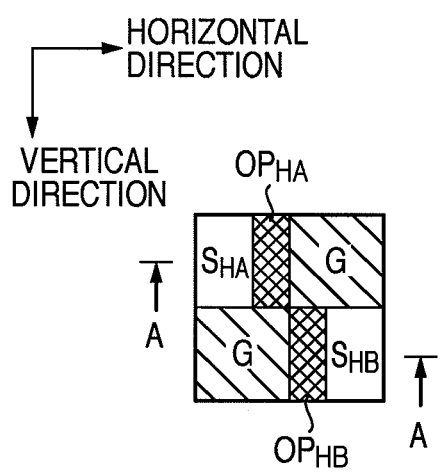

FIGS. 6A and 6B show the disposition and structure of the focus detection pixels for pupil division in a horizontal direction (first direction) of the photographing optical system. By dividing the exit pupil in the horizontal direction, focus detection of an object having a luminance distribution in the horizontal direction, such as vertical stripes, can be performed. FIG. 6A is a plan view of 2 rows×2 columns of pixels including focus detection pixels. In a case in which an image signal is obtained for recording or viewing, at the G pixels the luminance information main component is acquired. This is because human image recognition characteristics are sensitive to luminance information, and when G pixels are lost picture quality degradation is easily noticeable. By contrast, although the R pixels and the B pixels are pixels that acquire color information (color difference information), because human visual characteristics are insensitive to color information, picture quality degradation is difficult to recognize even with a certain amount of loss of the pixels that acquire color information. Accordingly, in the present embodiment, of the 2 rows×2 columns of pixels, the G pixels are left as image sensing pixels whereas the R pixel and the B pixel are replaced as focus detection pixels. A first focus detection pixel group composed of these focus detection pixels is shown in FIG. 6A as $S_{HA}$ and $S_{HB}$.

A cross-sectional view along A-A shown in FIG. 6A is shown in FIG. 6B. The microlens ML and the photoelectric converter element PD have the same structure as the image sensing pixels shown in FIG. 5B. In the present embodiment, since the focus detection pixel signals are not used in image generation, a transparent film $CF_W$ (white) is provided in place of the color separation color filter. In addition, in order to carry out pupil division at the photoelectric converter element PD, an opening in the wiring layer CL is shifted with respect to the centerline of the microlens ML. Specifically, an opening $OP_{HA}$ in the pixel $S_{HA}$ is shifted horizontally (toward the right in FIGS. 6A, 6B), and thus receives a light flux passing through the exit pupil $EP_{HA}$ on the left side of the photographing optical system TL. A pixel group having an opening $OP_{HA}$ like that of pixel $S_{HA}$ is a reference pixel group for detecting an amount of image shift from a pixel $S_{HB}$ pixel group described later. Similarly, an opening $OP_{HB}$ in the pixel $S_{HB}$, is shifted in the opposite direction from pixel $S_{HA}$ to the left, and receives the light flux passing through an exit pupil $EP_{HB}$ on the right side of the photographing optical system TL. A pixel group having an opening $OP_{HB}$ like that of pixel $S_{HB}$ is a reference pixel group for detecting an amount of image shift from the pixel $S_{HA}$ pixel group. Accordingly, assume that an object image acquired by groups of pixels $S_{HA}$ regularly arranged so as to be spaced at equal intervals in one direction is an image A. Then, if it is assumed that an object image acquired by groups of pixels $S_{HB}$ also regularly arranged so as to be spaced at equal intervals in the same direction is an image B, by detecting the relative positions of image A and image B, an amount by which the object image is out of focus (a defocus amount) can be detected.

Thus, the defocus amount can not be obtained only from the image A or only from the image B, since it is necessary to detect the relative position of the image A with respect to the image B (or vise versa) to calculate the defocus amount.

Further, the defocus amount can be calculated by shifting the openings $OP_{HA}$ and $OP_{HB}$ to the direction opposite to the shift direction shown in FIGS. 6A and 6B as shown in FIGS. 7A and 7B, namely, the opening $OP_{HA}$ is shifted to the left, and the opening $OP_{HB}$ is shifted to the right.

Moreover, in a case in which it is desired to detect the defocus amount of an object having luminance distribution in the vertical direction (second direction), as is described later the arrangement may be rotated 90 degrees so that the opening $OP_{HA}$ in the pixel $S_{HA}$ is shifted toward the bottom and the opening $OP_{HB}$ in the pixel $S_{HB}$ is shifted toward the top. Alternatively, the opening $OP_{HA}$ may be shifted toward the top and the opening $OP_{HB}$ may be shifted toward the bottom.

FIGS. 7A and 7B are diagrams showing disposition of the image sensing pixels and the focus detection pixels. FIG. 7A shows pixel distribution after thinning, in which the number of pixels is thinned to ⅓ in the horizontal direction and to ⅓ in the vertical direction. In FIG. 7A, the G, R, and B are pixels that are read out during thinning readout. The blank pixels in FIG. 7A in which no symbols are written are pixels that are not read out during thinning readout.

In addition, since the pixels for focus detection cannot be used for image sensing, in the present embodiment the pixels for focus detection are dispersedly disposed at certain intervals in the horizontal direction and in the vertical direction. Moreover, so that deterioration of the image does not become noticeable, it is preferable that the pixels for focus detection not be disposed at the G pixel portions. In the present embodiment, a set of pixels $S_{HA}$ and pixels $S_{HB}$ is disposed inside blocks of 4×4 pixels (12×12 pixels in the pre-thinned pixel disposition) indicated in FIG. 7A by bold lines. BLOC_H (i,j) shown throughout FIG. 7B indicate block names. Matters are arranged so that the arrangement order is completed in 4×4 blocks.

With regard to the arrangement of focus detection pixels, in the blocks BLOCK_H with the same horizontal number and with the different vertical numbers, the positions of the pixels $S_{HA}$ and $S_{HB}$ are shifted in the horizontal direction for one pixel (three pixels in the pre-thinned pixel disposition). More specifically, in the BLOCK_H(0, 0), BLOCK_H(0, 1), BLOCK_H(0, 2) and BLOCK_H(0, 3), the positions of the pixels $S_{HA}$ and $S_{HB}$ are shifted in the horizontal direction for one pixel (three pixels in the pre-thinned pixel disposition). This is expressed by arrows in FIG. 7B. This is designed to improve the sampling characteristics of the focus detection pixel groups disposed dispersedly. That is, because pixels $S_{HA}$ and pixels $S_{HB}$ are pixel groups in which the pupil is divided horizontally, the shift amount is in units of 1 pixel so as to increase the density of sampling in the horizontal direction.

FIG. 7B is a diagram showing the order of disposition between blocks BLOCK_H(i, j). The parts in FIG. 7B shown by the bold frame lines indicate the blocks BLOCK_H (i,j). The arrows in FIG. 7B schematically indicate that blocks having the same pixel disposition of the block BLOCK_H(0, 0) are BLOCK_H(1, 1), BLOCK_H(2, 2) and BLOCK_H(3, 3). Similarly, the arrows in FIG. 7B also indicate that blocks having the same pixel disposition of the block BLOCK_H(0, 1) are BLOCK_H(1, 2), BLOCK_H(2, 3) and BLOCK_H(3, 0). The same explanation is applied for the blocks BLOCK_H (0, 2) and BLOCK_H(0, 3), and explanation for these blocks is omitted here. By arranging focus detection pixels by shifting the phase by block, the sampling characteristics in the vertical direction is improved.

FIG. 8A, like FIG. 7A, is a diagram showing disposition of image sensing pixels and focus detection pixels. FIG. 8A, like FIG. 7A, shows pixel distribution after thinning, in which the number of pixels is thinned to ⅓ in the horizontal direction and to ⅓ in the vertical direction. In FIG. 8A, the G, R, and B are pixels that are read out during thinning readout. The blank pixels in FIG. 8A in which no symbols are written indicate pixels that are not read out during thinning readout. The pixel $S_{VC}$ pixel groups in FIG. 8A are focus detection pixels formed with pixel openings $OP_{VC}$ shifted in the vertical direction (toward the top in FIG. 8A), and are reference pixel groups for detecting an amount of image shift in the vertical direction from pixel $S_{VD}$ pixel groups described later. The pixels $S_{VD}$ are pixels formed with pixel openings $OP_{VD}$ shifted downward in the opposite direction from the pixels $S_{VC}$, and form a reference pixel group for detecting an amount of image shift in the vertical direction together with the pixel $S_{VC}$ pixel group. A second focus detection pixel group is formed of the pixels $S_{VC}$ and $S_{VD}$.

In addition, since the pixels for focus detection cannot be used for image sensing, in the present embodiment the pixels for focus detection are dispersedly disposed at certain intervals in the horizontal direction and in the vertical direction. Moreover, so that deterioration of the image does not become noticeable, it is preferable that the pixels for focus detection not be disposed at the G pixel portions. In the present embodiment, a set of pixels $S_{VC}$ and pixels $S_{VD}$ is disposed inside each of blocks of 4×4 pixels (12×12 pixels in the pre-thinned pixel disposition) indicated by the bold lines in FIG. 8A. BLOC_V (i,j) shown throughout FIG. 8B indicate block names. Matters are arranged so that the arrangement order is completed in 4×4 blocks. The order of disposition is the same order of disposition shown in FIG. 7A and FIG. 7B, rotated 90 degrees to match the direction of pupil division.

FIGS. 9A and 9B show a configuration in which image shift amounts in the horizontal direction and in the vertical direction in FIGS. 7A, 7B and FIGS. 8A, 8B can be detected within the same ranging field of view. In FIGS. 9A and 9B, BLOCK_H (i,j) (for detection of the shift amount in the horizontal direction) and BLOCK_V (i,j) (for detection of the shift amount in the vertical direction) are disposed in a checkered pattern.

FIG. 9A shows a detailed disposition in which the pixel portions as well are depicted. With a checkered pattern configuration using 4×4 blocks for horizontal and vertical detection, 1 pattern is completed in an 8×8 block, but, since the drawing will get complicated, only a 4×4 block is depicted. The block names when arranged in a checkered pattern are given as BLOCK_C (i,j).

FIG. 9B is a diagram showing BLOCK_H (i,j) and BLOCK_V (i,j) corresponding to the BLOCK_C (i,j) depicted in FIG. 9A. The regularity of the checkered pattern can be seen by referring to FIG. 9B.

FIG. 10A is a diagram further showing disposition of detection pixels for vertical line detection corresponding to extracting and reading out one area of a photographic screen, as in an electronic viewfinder enlargement mode and a digital zoom with moving images. In FIG. 10A, the basic disposition is the disposition shown in FIGS. 7A and 7B.

Although enlargement and digital zoom are modes that partially read out a portion of the photographic area, all the pixels inside the read-in area are read out without thinning. Therefore, in a case such as this, supplementally providing pixels $S_{HA}$ and pixels $S_{HB}$ as a third focus detection pixel group in addition to the first focus detection pixel group that is read out during thinning readout mode can further improve focus detection accuracy.

FIG. 10A, like FIG. 7A, is a diagram showing disposition of image sensing pixels and focus detection pixels. FIG. 10A, like FIG. 7A, shows pixel distribution after thinning, in which the number of pixels is thinned to ⅓ in the horizontal direction and to ⅓ in the vertical direction. The G, R, and B in FIG. 10A are pixels that are read out during thinning readout. The blank pixels in FIG. 10A in which no symbols are written indicate pixels that are not read out during thinning readout. During enlargement and digital zoom, the blank portion pixels in FIG. 10A are also read in, and enlarged and displayed.

The focus detection pixels disposition order is based on the same thought as FIGS. 7A and 7B, the detailed explanation is omitted here. The SA pixels indicated by blank arrows in FIG. 10A are pixels supplementally provided so that sampling during full-pixel readout is improved. They are disposed so as to complement the SA pixels indicated by black arrows that are read out during thinning readout so as to minimize sampling pitch.

Vertical direction sampling, as with the dispositions shown in FIG. 7A and FIG. 8A, is more scattered compared to the horizontal direction, so as to prevent image degradation.

FIG. 10B shows the order of disposition per block in FIG. 10B, and is the same order as in FIG. 7B.

In addition, with regard to the focus detection for the horizontal lines, in the horizontal line detection pixel disposition in FIGS. 8A and 8B as well, during full-pixel readout it is preferable that, as in FIGS. 10A and 10B, pixels $S_{VC}$ and pixels $S_{VD}$ be disposed supplementally as the third focus detection pixel group in addition to the second focus detection pixel group read out during thinning readout. With respect to the disposition order, this is clear from FIG. 7A and FIG. 10A, and thus a detailed description thereof is omitted.

The vertical and horizontal line detection within the same field of view, as well, can be realized using the same configuration as shown in FIG. 9B, and thus a description thereof is omitted.

Thus, as described above, focus detection pixel groups are dispersedly disposed in pixel groups that are read out during thinning readout. Especially, it is arranged so that both of a pair of pixels $S_{HA}$ and $S_{HB}$ in images A and B, respectively, obtained by pupil division, are read out during thinning readout. This is because it is necessary to detect the relative position between the images A and B in order to calculate the defocus amount. Similarly, a pair of pixels $S_{VC}$ and $S_{VD}$ forming the images A and B, respectively, are arranged so as to be read out during thinning readout.

In the aforesaid manner, it is possible to fully secure focus detection accuracy even for still image photography photographed with all pixels while suppressing picture quality degradation in the thinning readout mode.

Thus, still image photography from the thinning readout electronic viewfinder mode and moving image mode can be executed without full-pixel readout and redone focus detection.

In addition, in a case in which a portion of the image sensing pixels are read out without thinning, as in electronic viewfinder enlargement mode and moving image digital zoom, focus detection pixels are provided in pixel portions that are not read out during thinning readout, thereby enabling focus detection accuracy to be further improved.

It should be noted that each pair of the pixels $S_{HA}$ and $S_{HB}$ or the pixels $S_{VC}$ and $S_{VD}$ for the images A and B, respectively, explained above with reference to FIGS. 7A, 8A, 9A and 10A are arranged shifted either in the horizontal or vertical direction. This shift should be taken into account during calculation of the defocus amount. This shift prevents the G filters used for extracting luminance signals from being reduced.

(Variation)

The focus detection pixel disposition depicts no more than an example thereof. Therefore, a variety of dispositions are possible within the scope of the present invention, and such dispositions are included within the present invention. Also, the proportions involved in image sensing pixels thinning readout are not limited to ⅓ and may be varied as convenient, and such variations are also included within the present invention.

In addition, with the focus detection pixels used in the preferred embodiments of the present invention 2 pixels form 1 set. Accordingly, for the pupil area divided in two, one pixel receives the light flux that passes through one pupil and the other pixel receives the light flux that passes through the other pixel. By contrast, the photographing lens pupil division may be carried out by dividing the photoelectric converter unit behind the on-chip microlens into multiple parts as with the image sensing pixels disclosed in FIG. 2 of Japanese Patent Application Laid-Open (JPA) No. 2003-156677. In this case, image sensing pixels are used that are constructed so that the light fluxes from the divided pupil areas are acquired independently and those signals are output.

The focus detection apparatus of the present art is applicable not only to an electronic still camera but also to a camcorder that performs moving image sensing (movie camera), a variety of inspection cameras, a surveillance camera, an endoscopic camera, a robot camera, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-204574, filed on Aug. 6, 2007, which is hereby incorporated by reference herein in its entirety.

The invention claimed is:

1. An image sensing apparatus comprising:
an image sensor including a plurality of image sensing pixels, first focus detection pixel pairs each pixel of which having a light receiving area shifted with respect to an optical axis so that a first phase difference is detectable from image signals output from the first focus detection pixel pairs, and second focus detection pixel pairs each pixel of which having a light receiving area shifted with respect to the optical axis so that a second phase difference is detectable from image signals output from the second focus detection pixel pairs; and a controller that, in a first control mode for performing thinning readout of signal charges from a first set of pixels of the image sensor, controls so that the first focus detection pixel pairs are read out without reading out the second focus detection pixel pairs, and, in a second control mode for performing thinning readout of signal charges from a second set of pixels of the image sensor, controls so that the first and second focus detection pixel pairs in a predetermined area of the image sensor are read out, the predetermined area being an area of the image sensor to be enlarged when digital zoom is specified.

2. The image sensing apparatus according to claim 1, wherein the light receiving areas of the first focus detection pixel pairs and the light receiving areas of the second focus detection pixel pairs are shifted either in a row direction or a column direction.

3. The image sensing apparatus according to claim 1, wherein the control unit calculates a defocus amount based on signal charges read out from the first focus detection pixel pairs in the first control mode, and calculates a defocus amount based on signal charges read out from the first and second focus detection pixel pairs in the second control mode.

4. The image sensing apparatus according to claim 1, wherein the first and second focus detection pixel pairs are dispersedly disposed in the image sensor.

5. The image sensing apparatus according to claim 1, wherein, in a case where the digital zoom is specified, the image sensing pixels and the first and second focus detection pixel pairs in the predetermined area are readout without being thinned out.

6. The image sensing apparatus according to claim 1, wherein, in a case where the digital zoom is specified, a portion of a photographic screen of the image sensor is read out.

* * * * *